Aug. 18, 1964 W. H. TAYLOR 3,144,953
ANTI-SLOSH DEVICE
Filed Dec. 20, 1961 4 Sheets-Sheet 1

INVENTOR - WILLIAM H. TAYLOR
BY Hole W. Ballard
ATTORNEY

Aug. 18, 1964   W. H. TAYLOR   3,144,953
ANTI-SLOSH DEVICE
Filed Dec. 20, 1961   4 Sheets-Sheet 2

INVENTOR- WILLIAM H. TAYLOR
BY
ATTORNEY

Aug. 18, 1964   W. H. TAYLOR   3,144,953
ANTI-SLOSH DEVICE
Filed Dec. 20, 1961   4 Sheets-Sheet 3

INVENTOR- WILLIAM H. TAYLOR
BY Hyde W. Ballard
ATTORNEY

Aug. 18, 1964     W. H. TAYLOR     3,144,953
ANTI-SLOSH DEVICE

Filed Dec. 20, 1961     4 Sheets-Sheet 4

INVENTOR— WILLIAM H. TAYLOR
BY Hallocan Ballard
ATTORNEY

United States Patent Office 3,144,953
Patented Aug. 18, 1964

3,144,953
ANTI-SLOSH DEVICE
William H. Taylor, 233 Elwood Ave., West Chester, Pa.
Filed Dec. 20, 1961, Ser. No. 160,715
4 Claims. (Cl. 220—22)

This invention relates to the provision of an inflatable bulkhead constructed to form air-filled compartments in a liquid tank or container. In particular, the invention pertains to a removable and inflatable bag which may be installed in a tank of the type commonly used on liquid transporting vehicles for preventing all sloshing or surging of the liquid contents of the tank.

The transportation of liquids in tank trucks as well as in rail tankers presents the problem of eliminating the surging of the liquid in the tank. In the case of partial loads this surging of the liquid particularly in tank trucks or trailers can present a very serious problem of control and swaying of the trailer. Such surging on the application of the tractor brakes as well as on rounding curves presents a safety hazard in the high-speed transportation of liquid in tank trailers over the highway in the commercial carrying of any type of liquid. However, it will be understood that the invention may be applied equally well to any other type of liquid container in vehicles subject to motion such as aircraft, railroads, ships, and the like.

The primary object of the invention, therefore, is to provide an improved bulkhead for liquid containers which prevents all surging of the liquid therein.

A further object of the invention is to provide an inflatable bulkhead which may be sealed in place by means of fluid pressure to form a fluid filled compartment in a liquid container.

A further object of the invention is to provide an inflatable bag adapted to be inserted through an opening in a liquid container and means for inflating the bag to force liquid in the container into a completely liquid filled compartment.

A further object of the invention is to provide a dual inflatable bulkhead for a liquid tank which may be inserted through a central manhole at the top of the trailer and thereupon inflated to force liquid in the tank against each end of the trailer and to provide a fluid pressurized compartment between said liquid sections.

Further objects will be apparent from the specification and drawings in which

Figure 1:
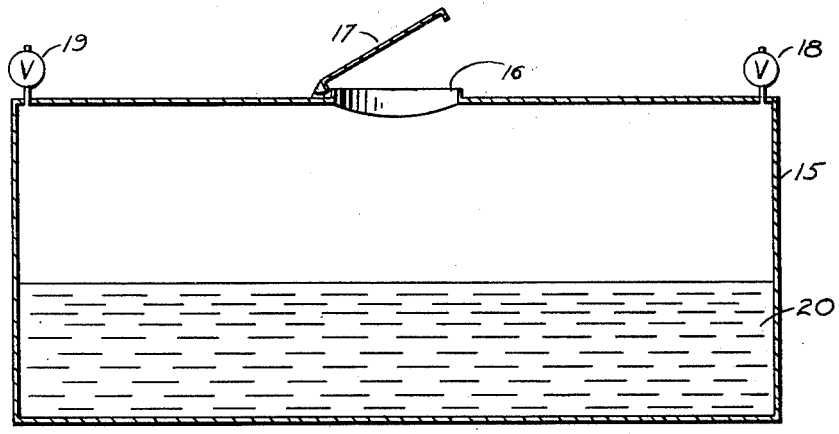
Figure 2:
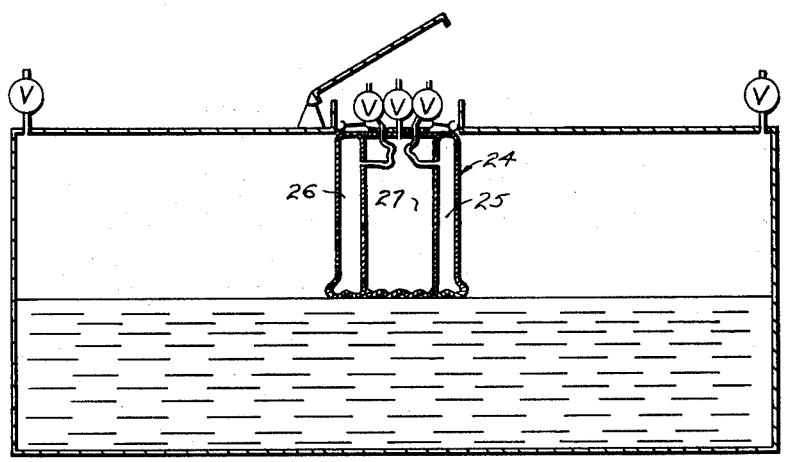
Figure 3:
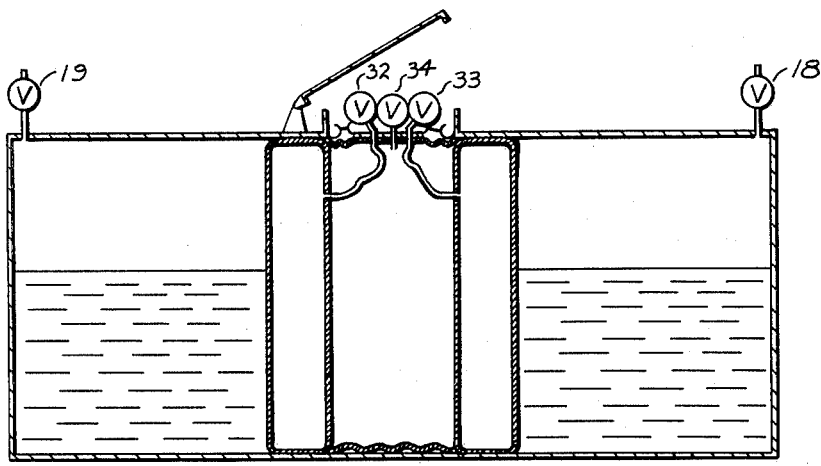
Figure 4:
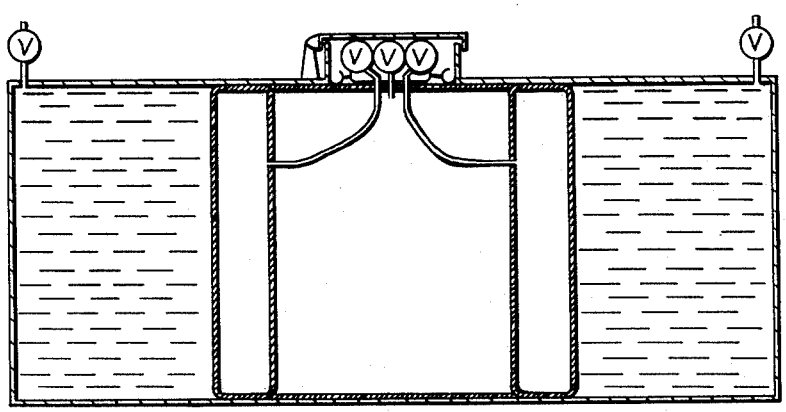
Figure 5:
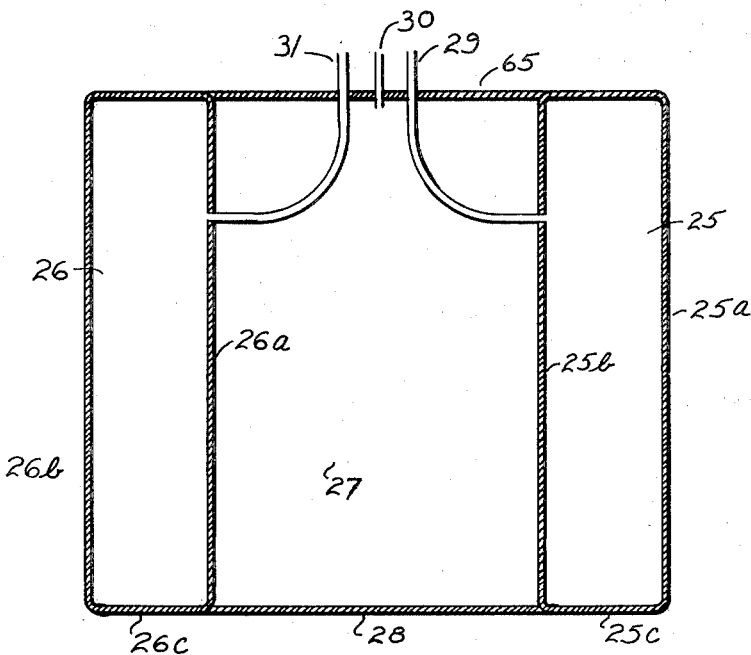
Figure 6:
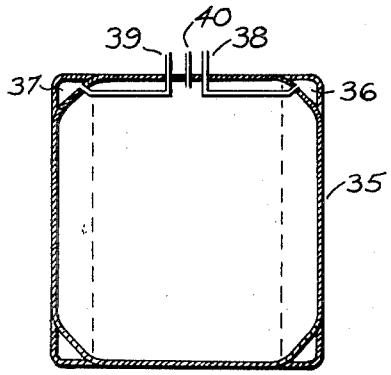
Figure 7:
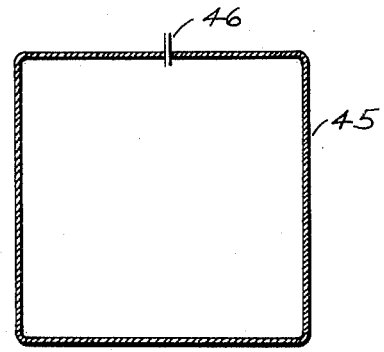
Figure 8:
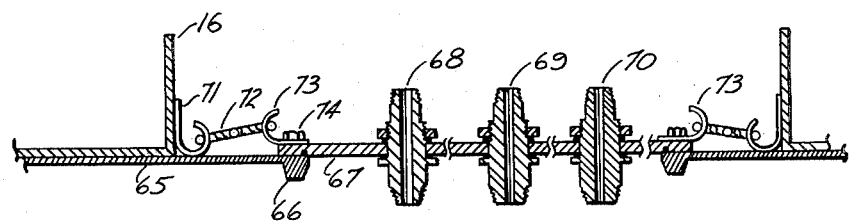
Figure 9:
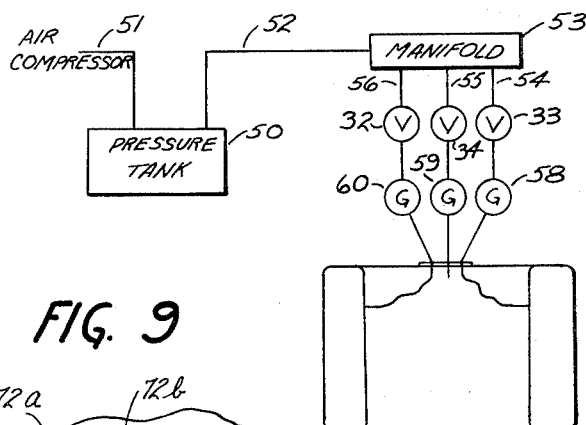
Figure 10:
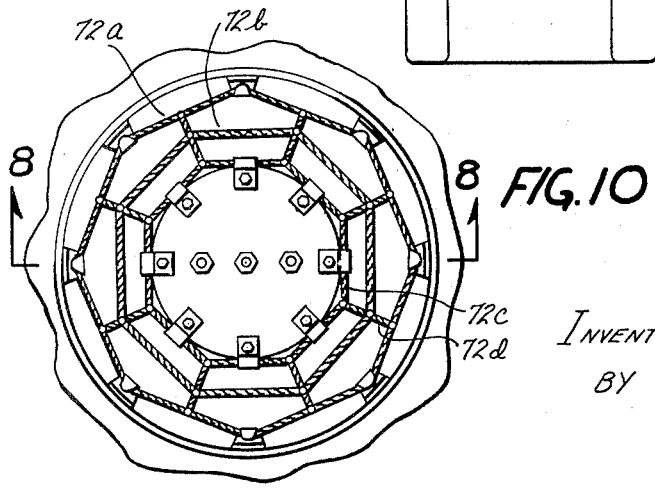

FIG. 1 is a transverse section of a liquid tank or container such as might be used on a road type trailer, FIG. 2 is a view of the liquid container of FIG. 1, showing the initial steps and the position of the inflatable bulkhead constructed in accordance with the present invention, FIG. 3 is a view similar to FIG. 2 as the bulkheads are inflated to form a compartment at each end of the container and the center compartment is being filled with air, FIG. 4 is a further progressive view showing the inflatable bulkheads positioned and the manhole cover closed, as would be the case during actual transportation, FIG. 5 is an enlarged section of the inflatable bag or dual bulkhead shown in FIGS. 2-4, FIG. 6 shows a modification of the container and inflatable bulkhead of FIG. 5, FIG. 7 shows a further modification of the inflatable bag of FIG. 5, having no separate compartments to form sealing bulkheads, FIG. 8 is an enlarged sectional detail of the fluid connections for the inflatable bulkhead of FIG. 4 as seen at 8—8 of FIG. 10, FIG. 9 is a schematic diagram showing the valves and means for inflating the compartments or bulkheads, and FIG. 10 is a plan of the top of the structure of FIG. 4 showing the manhole with cover raised.

The invention comprises essentially the provision of an inflatable bag which when deflated is collapsed to a condition that can be readily inserted and removed from the conventional top closure or manhole in a standard liquid type trailer. In the preferred form the inflatable bag is constructed in the same general cross-sectional shape of the trailer, preferably round or oval. At each end of the bag when inflated I provide a longitudinally inextensible bulkhead which may be inflated to provide a seal against the inner wall of the trailer but which may be moved, partially inflated, to force the liquid contents into each end of the tank or container.

Referring now more particularly to the drawings, a liquid tank or container 15 is provided with a manhole 16 and a manhole cover 17 in accordance with conventional practice. Each end of the container 15 is provided with a manually operable or check valve 18 and 19. These valves may be of the type that are completely closed manually or of the one-way valve type which permits egress of fluids without ingress of any air. The tank 15 is shown in FIG. 1 partially filled with a liquid 20 such as water, gasoline, milk, or any of the other commonly transported liquids. It will be apparent that with the tank 15 filled approximately half or less, as shown in FIG. 1, the surging or sloshing of this liquid during acceleration, deceleration and turning of the tank presents a serious control problem during movement. The provision of permanent baffles in a tank of this type is not feasible because it is necessary to have the interior of the tank completely accessible for cleaning purposes and, furthermore, such baffles are only partially effective. In order to completely eliminate all surging and sloshing, I insert a deflatable bag assembly 24 through the manhole 16, as shown in FIG. 2. The preferred form of the deflated bag as shown particularly in FIG. 5 has two oppositely disposed end compartments or bulkheads 25 and 26 which have relatively inflexible walls 25a, 25b, 26a, and 26b, respectively. The peripheral wall of each compartment 25 and 26 as shown as 25c and 26c is of a more flexible or extensible material so that each bulkhead may be sealed against the inner periphery of the container 15 with partial pressure, but insufficient to prevent longitudinal movement of the bulkheads inside the container. The center compartment 27 has a collapsible periphery or circumferential member 28 which limits the longitudinal displacement of compartments 25 and 26 when compartment 27 is fully inflated. Each of the three compartments 25, 26 and 27 is provided with a separate conduit for supplying fluid such as compressed air to the respective compartments. Conduit 29 supplies bulkhead 25; conduit 30 supplies compartment 27; conduit 31 supplies bulkhead 26.

Referring again to FIG. 2, the deflated bag assembly is inserted through the manhole 16 as described above with compartment 25 facing to the right and compartment 26 to the left. These compartments are filled under pressure together with the center compartment 27 to gradually force all of the liquid 20 in tank 15 into each end of the tank. As the three compartments are inflated sufficiently all of the liquid will be forced into either end of the tank, as shown in FIG. 3. Valves 18 and 19 are so set or constructed that they can adequately vent each end of the tank. With the inflatable bag assembly in the position shown in FIG. 3, sufficient air is admitted through conduits 29 and 31 to provide a seal around the periphery of bulkheads 25 and 26. This seal is achieved by means of the flexible peripheral surfaces 25c and 26c, respectively, of each bulkhead. At this point additional pressure is admitted to compartment 27 through conduit 30 to force the bulkheads 25 and 26 longitudinally in the container and to completely fill each end of the container with liquid, the air being vented through valves 18 and 19 (FIG. 4). As soon as all the air above the liquid in each end of the tank has been expelled through valves 18 and 19, valves 18 and 19 may be closed and the pressure increased in bulkheads 25 and 26 by opening valves 32 and 33. This provides an effective seal for each of the bulkheads and prevents shifting of the bulkheads during movement of tank. Additionally, sufficiently pressure may be admitted through valve 34 to insure that the density or weight of the liquid in each end of the container does not cause either of the bulkheads 25 or 26 to shift from a sealed position. With the tank 15 thus filled, all valves are closed and the cover 17 secured so that the trailer is ready to be hauled over the highway.

A modified form of inflatable bag is shown in FIG. 6 in which the bag 35 is provided with an annular inflatable ring 36 and 37 at either end. These annular inflatable rings are each connected to a source of fluid pressure through conduits 38 and 39, respectively. The main sealing face of the bag extends through the center of the annular rings 36 and 37 which then act merely as a pressurized seal to prevent shifting or collapsing of the main container 35. A conduit 40 supplies the required fluid under pressure to the container 35 in much the same manner as was described in connection with FIGS. 3 and 4.

In some installations it may not be necessary to employ separate bulkheads for sealing each end of the center compartment. Under these circumstances a single inflatable bag or container 45 (FIG. 7) may be employed having only one fluid conduit 46.

Referring now to FIG. 9, the fluid connections for inflating the compartments of FIG. 5 include a source of fluid pressure such as a storage tank 50 having a conduit 51 leading to a suitable air compressor or the like. A conduit 52 connects tank 50 to a manifold 53 which is provided with three conduits 54, 55, and 56 connected to valves 32, 33, and 34. If desired, gauges 58, 59 and 60 may be attached to each of the lines to indicate to the operator the amount of pressure in each of the bulkheads as well as the center compartment.

The means for supporting the container in the liquid tank are shown in FIGS. 8 and 10 and for this purpose I employ a net for suspending the container. The top portion 65 of the bag shown in FIG. 5 is provideded with a circular opening defined by a reinforced annular section 66 (FIG. 8). This annular section 66 is bolted to a circular plate 67 having three fittings 68, 69 and 70 to which the conduits 29, 30, 31, are connected both inside and outside of the bag portion 65. Around the inner portion of the manhole 16, I provide a series of hangers 71, from which the center plate 67 is suspended by means of a flexible or resilient anular net 72, which may be hooked around a series of brackets 73, bolted to plate 67 by means of bolts 74 which in turn secure the plate 67 to the annular section 66. The net 72, as seen in FIG. 10, has an outer circular strand 72a, an intermediate strand 72b and an inner strand 72c. A series of radial strands 72d are provided to complete the construction of the net so that it may be readily connnected and disconnected from both the manhole 16 as well as the plate 67. This net simply prevents the bag from falling into the container before it has been inflated and during the insertion step, it also assists in resisting any tendency for the internal pressure in compartment 27 from bulging the plate 67 outwardly an excessive amount.

It will thus be understood that I have provided an effective, inexpensive, removable bulkhead for preventing any surging or sloshing of liquid in a liquid container subject to movement.

Having thus described my invention, I claim:

1. An anti-surge liquid cargo container assembly comprising a relatively rigid tank, a hatch centrally positioned on the top of said tank, an inflatable member within said tank and capable of insertion through said hatch when in a deflated state, said member comprising a central collapsible bag and a compartment at each end of the bag forming a sealing bulkhead, the contour of each of said sealing bulkheads conforming to the internal shape of the tank, said member when in an inflated state forming a liquid-tight bulkhead extending from the top to the bottom of said tank and dividing said tank into two separate, longitudinally spaced, substantially liquid-tight compartments, and conduit means for supplying fluid under pressure to each of said sealing bulkheads and to said bag to inflate each.

2. A container assembly in accordance with claim 1 wherein each end bulkhead has a relatively inflexible end wall and a more flexible side wall connecting said end wall to the central bag.

3. Apparatus in accordance with claim 1 having means including a net secured to the hatch for suspending the bag assembly from the hatch of the tank.

4. An inflatable member for insertion into a liquid tank container for forming a bulkhead to prevent surging and sloshing of liquid present therein, said member comprising a central collapsible bag and a compartment extending from each side of said bag forming a sealing bulkhead, each sealing bulkhead having a relatively inflexible end wall and a more flexible side wall connecting said end wall to the central bag, and conduit means connected to the central bag and to each bulkhead for permitting the passage of a fluid under pressure thereinto to inflate same.

References Cited in the file of this patent
UNITED STATES PATENTS

| 1,690,072 | Johnson | Oct. 30, 1928 |
| 2,764,950 | Finnell | Oct. 2, 1956 |

FOREIGN PATENTS

| 1,240,330 | France | July 25, 1960 |